United States Patent
Khairnar et al.

(10) Patent No.: US 11,808,292 B2
(45) Date of Patent: Nov. 7, 2023

(54) STRUCTURAL FASTENER INCLUDING COUPLER FOR THREADED ROD

(71) Applicant: Eaton Intelligent Power Limited, Dublin (IE)

(72) Inventors: Lalit Khairnar, Aakurdi (IN); Martin Lee Witherbee, Godfrey, IL (US); Amol Khalkar, Nasik (IN); Rajendra Vishwanath Pawar, Pune (IN); Sayali Shridhar Dhale, Yavatmal (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/685,846

(22) Filed: Mar. 3, 2022

(65) Prior Publication Data
US 2022/0282744 A1 Sep. 8, 2022

Related U.S. Application Data

(60) Provisional application No. 63/155,871, filed on Mar. 3, 2021.

(51) Int. Cl.
*F16B 2/02* (2006.01)
*F16B 37/08* (2006.01)

(52) U.S. Cl.
CPC ............ *F16B 2/02* (2013.01); *F16B 37/0871* (2013.01)

(58) Field of Classification Search
CPC .. F16B 39/36; F16B 37/0857; F16B 37/0821; F16B 2/02; F16B 37/0871;
(Continued)

(56) References Cited

U.S. PATENT DOCUMENTS 2,814,324 A 11/1957 Shur
4,923,349 A 5/1990 Logsdon
(Continued)

FOREIGN PATENT DOCUMENTS

| CN | 102272462 A | 12/2011 |
| DE | 1928490 A1 | 1/1970 |
| EP | 3225859 B1 | 11/2018 |

OTHER PUBLICATIONS

Extended European Search Report, dated Jul. 18, 2022, 8 pages.
(Continued)

*Primary Examiner* — Sarang Afzali
*Assistant Examiner* — Darrell C Ford
(74) *Attorney, Agent, or Firm* — Stinson LLP

(57) ABSTRACT

The present disclosure provides a structural fastener includes a threaded rod coupler. The threaded rod coupler includes a split nut for coupling to the threaded rod. The threaded rod coupler further includes a housing connected to the structure coupler. The split nut may be received in the housing. The threaded rod coupler further includes first and second springs each coupled to and biasing corresponding one of first and second nut portions of the split nut toward one another. The present disclosure further provides a method of attaching a threaded rod to a structural component using a structural fastener. The method includes coupling a structural fastener to the structural component, sliding the threaded rod through a split nut of the structural component couple the rod to the structural fastener, and receiving springs secured in a nut arm of the split nut within a housing of the structural fastener.

16 Claims, 22 Drawing Sheets

(58) Field of Classification Search
CPC ......... Y10T 29/49945; Y10T 29/49947; Y10T 29/49948; Y10T 29/49963
USPC .......................................... 411/265–267, 278
See application file for complete search history.

(56) References Cited

U.S. PATENT DOCUMENTS

| | | | |
|---|---|---|---|
| 5,340,252 A | 8/1994 | Weddendorf | |
| 5,902,085 A * | 5/1999 | Yuta .................... | F16B 37/0857 411/908 |
| 7,331,745 B2 * | 2/2008 | Giehl .................. | F16B 37/0864 411/433 |
| 8,132,767 B2 | 3/2012 | Oh et al. | |
| 8,998,155 B2 * | 4/2015 | Oh ...................... | F16B 37/0864 248/220.21 |
| 2007/0120025 A1 * | 5/2007 | Wilson .................... | B25B 5/101 248/125.7 |
| 2008/0277536 A1 * | 11/2008 | Olle .................... | F16B 37/0807 403/374.3 |
| 2010/0108840 A1 | 5/2010 | Oh et al. | |
| 2012/0167358 A1 | 7/2012 | Oh et al. | |
| 2013/0028681 A1 * | 1/2013 | Limpert .............. | F16B 37/0857 411/108 |
| 2018/0187705 A1 | 7/2018 | Oh | |
| 2020/0025235 A1 * | 1/2020 | Smith ................. | F16B 37/0821 |
| 2020/0240450 A1 * | 7/2020 | Lepper ................ | F16B 37/0885 |
| 2022/0026014 A1 * | 1/2022 | Liao ....................... | F16M 11/28 |

OTHER PUBLICATIONS

First Office Action and Search Report, and translation thereof, from CN Application No. 202210201717.7, dated Apr. 15, 2023, 17 pages.
Notice of Allowance and Search Report from CN Application No. 202210201717.7, dated Aug. 23, 2023, 4 pages.

* cited by examiner

STRUCTURAL FASTENER INCLUDING COUPLER FOR THREADED ROD

CROSS REFERENCE TO RELATED APPLICATIONS

This application claims the benefit of U.S. Provisional Application No. 63/155,871, filed Mar. 3, 2021, the contents of which are incorporated herein in their entirety.

FIELD OF THE DISCLOSURE

The present disclosure generally relates to a structural fastener including a coupler for a threaded rod.

BACKGROUND OF THE DISCLOSURE

Structural fasteners may be used to attach non-structural components to a load-bearing structural component of a structure. In certain applications, a structural fastener may be used to attach a threaded rod (e.g., an all threaded rod) to a load-bearing structural component, such as a beam of a building. Additional non-structural components may be attached to the threaded rod. For example, a conduit, pipe, or other non-structural building component may be attached to the threaded rod to suspend the non-structural component within a structure. In one particular example, the structural fastener include a beam clamp configured to attach the threaded rod to a beam of a building or other structure.

SUMMARY OF THE DISCLOSURE

In one aspect, a structural fastener for attaching a threaded rod to a structural component generally comprises a structure coupler configured to couple to the structural component; and a threaded rod coupler connected to the structure coupler. The threaded rod coupler is configured to couple to the threaded rod. The threaded rod coupler includes a split nut configurable between i) an open position to allow the threaded rod to slide axially through the split, and ii) a closed position to threadably engage the threaded rod.

In another aspect, a structural fastener for attaching a threaded rod to a beam generally comprises a beam clamp configured to couple to the beam; and a threaded rod coupler connected to the beam clamp. The threaded rod coupler is configured to couple to the threaded rod. The threaded rod coupler includes a split nut configurable between i) an open position to allow the threaded rod to slide axially through the split, and ii) a closed position to threadably engage the threaded rod.

In yet another aspect, a method of attaching a threaded rod to a structural component using a structural fastener generally comprises coupling a structural fastener to the structural component; and sliding the threaded rod through a split nut of the structural component couple the rod to the structural fastener.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DISCLOSURE

Figure 1:
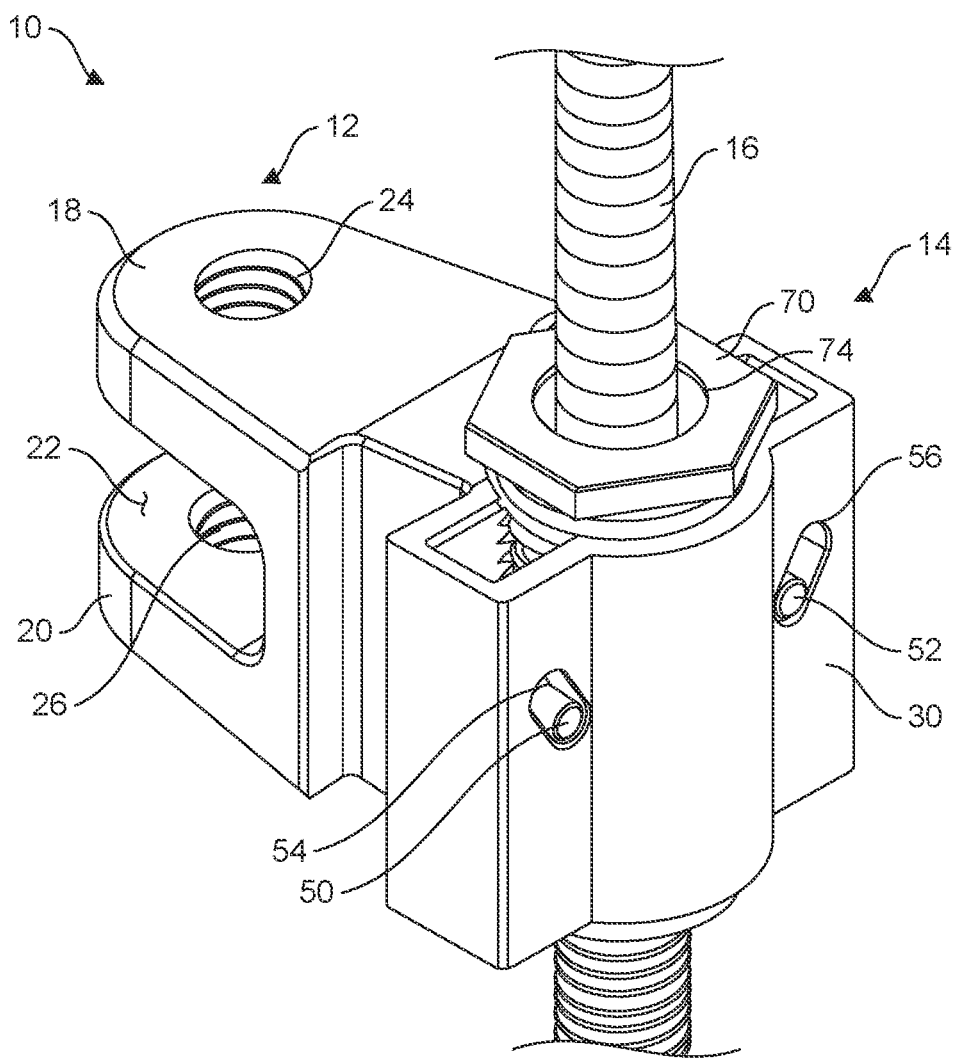
FIG. 1 is a perspective of one embodiment of a structural fastener coupled to a threaded rod.
Figure 2:
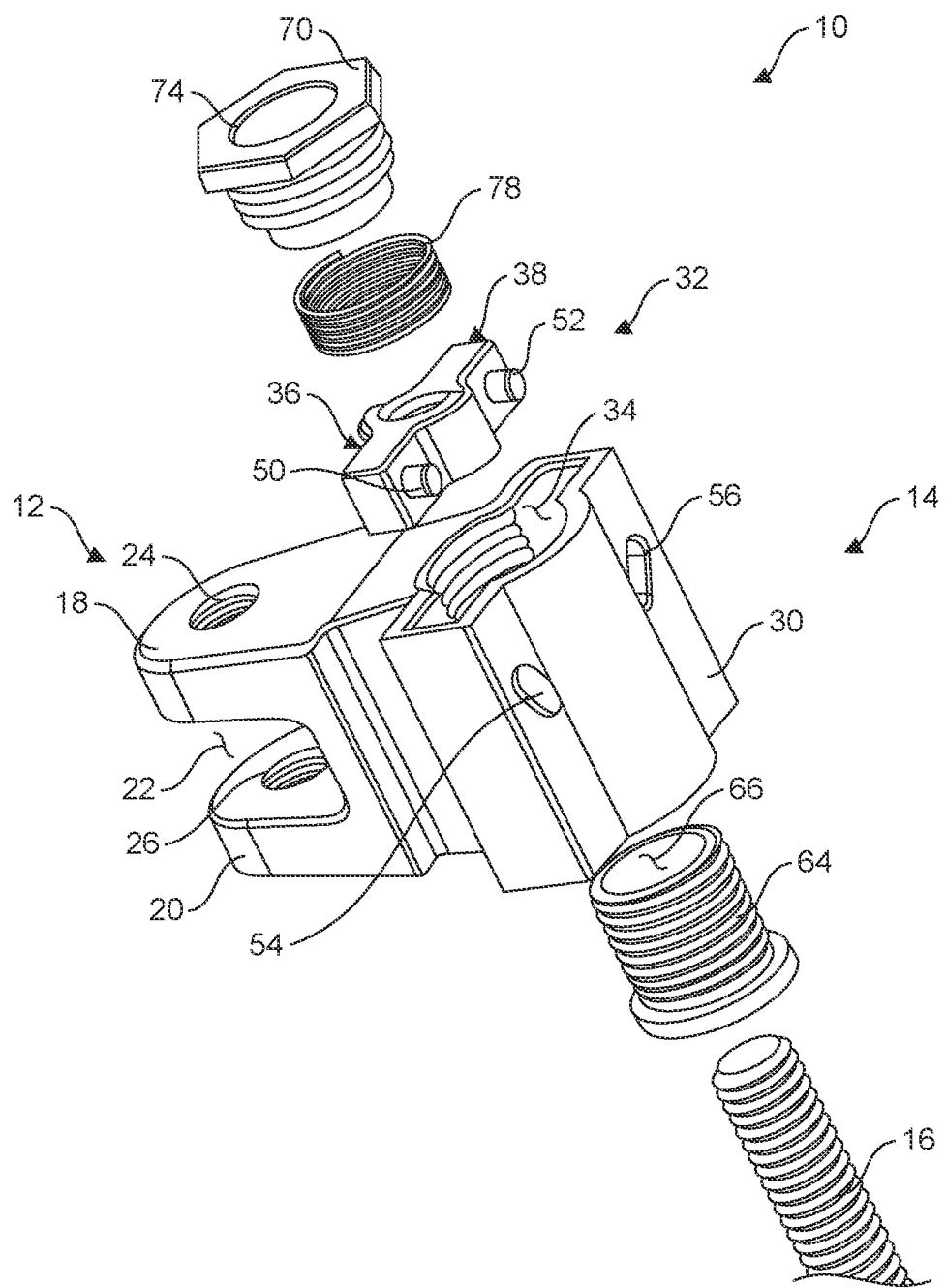
FIG. 2 is an exploded perspective of the structural fastener and the threaded rod of FIG. 1.

The present disclosure is directed to a structural fastener configured to attach a threaded rod (e.g., an all threaded rod) to a load-bearing structural component (e.g., a beam, strut, truss, brace or other structural component) of a structure, such as a building. A non-structural component (e.g., pipe, conduit, plenum, or other non-structural components) may in turn be secured to the threaded rod, such as to suspend the non-structural component from the load-bearing structural component. The structural fastener includes a structure coupler configured to couple to the load-bearing structural component, and a threaded rod coupler configured to couple to the threaded rod. The structure coupler and the threaded rod are connected to one another to form the structural fastener.

First Embodiment

Referring to FIGS. 1-10, one embodiment of a structural fastener constructed according to the teachings of the present disclosure is generally indicated at reference numeral 10. The structural fastener 10 includes a structure coupler, generally indicated at 12, and a threaded rod coupler, generally indicate at 14, configured to threadably couple to a threaded rod 16 (e.g., an all threaded rod). The structure coupler 12 of the illustrated structural fastener 10 comprises a beam clamp configured to couple to a structural beam (not shown). It is understood that in other embodiments, the structure coupler may be other types of couplers configured to couple to other load-bearing structural components. The illustrated beam clamp 12 includes opposing, spaced apart first and second jaws 18, 20 (i.e., upper and lower jaws as illustrated in the drawings) defining a jaw space 22 therebetween configured to receive a flange of a beam therein. At least one of the first and second jaws 18, 20 (e.g., each of the jaws) defines a threaded opening 24, 26 configured to threadably receive a set screw (not shown) therein. The set screw is configured to engage the flange of the beam received in the jaw space 22 upon tightening the set screw to couple the beam clamp 12 to the beam. The illustrated jaws 18, 20 are generally rigid and extend outward (e.g., are cantilevered) from the threaded rod coupler 14. The beam clamp may be of other constructions, such as a beam clamp including resiliently deflectable jaws that snap into the beam.

The threaded rod coupler 14 includes housing 30, and a split nut, generally indicated at 32, captured within a cavity 34 of the housing. The housing 30 is attached to the structure coupler 12 and may be integrally formed therewith. As an example, the housing 30 and the structure coupler 12 may be made from metal, such as by casting, forging, cutting, and other metal working processes. The split nut 32 comprises separate first and second nut portions, generally indicated at 36, 38 (e.g., first and second nut halves). Each nut portion 36, 38 includes a nut body 40, 42 that is internally threaded, and a nut arm 44, 46 extending outward from the body. The nut bodies 40, 42 generally oppose one another within the housing 30 and are movable toward and away from one another (upward and downward as illustrated) to open and close the split nut 32 when sliding the threaded rod 16 into the threaded rod coupler 14, as described in more detail below. When closed, the inner diameter of the split nut 32 is suitable for the split nut to be threadably received on the threaded rod 16. Pins 50, 52 coupled to the nut arms 44, 46 are slidably received in slots 54, 56 defined by the housing 30. The pins 50, 52 track within the slots 54, 56 as the split nut 32 opens and closes. The pins 50, 52 are received in openings 57, 58 (FIG. 7) in the nut arms 44, 46, although they may be coupled to the split nut 32 in other ways. The slots 54, 56 diverge away from one another at a suitable angle.

A through opening 60 for receiving the threaded rod 16 extends through the housing 30 and the cavity 34 and is generally aligned with the axis of the inner diameter of the split nut 32. In the illustrated embodiment, a bushing 64 defining a through passage 66 is threaded in a threaded lower portion 60A of the through opening below the split nut 32, as illustrated. The bushing 64 protects the threaded rod 16 from damage when inserting the threaded rod into the threaded rod coupling 14. The bushing 64 may be formed from plastic or other material. It is understood that in other embodiments the bushing may be omitted.

A lock 70 for selectively locking the split nut 32 in its closed position is threaded in an upper portion 60B of the through opening 60 above the split nut 32, as illustrated. The lock 70 defines a through passage 74 generally aligned with the through opening 60. A spring 78 (e.g., a compression spring, such as a coiled spring) is captured between the lock 70 and the split nut 32. When the lock 70 is threadably loosened in the through opening 60, the split nut 32 is biased in the closed position by force of the spring 78 and can be moved to its open position against the force of the spring. That is, the lock 70 provides a counter force to the spring 78 to bias the split nut 32 to its closed position while allowing the nut portions 36, 38 to move to open the split nut. When the lock 70 is threadably tightened in the through opening 60, the split nut 32 is fixed in its closed position and inhibited from opening. That is, the split nut 32 is closed and the nut portions 36, 38 are inhibited from moving within the housing 30 when the lock 70 is threadably tightened. The lock 70 may be formed from plastic or other material. The split nut 32 may be locked in its closed position in other ways.

Figure 3:
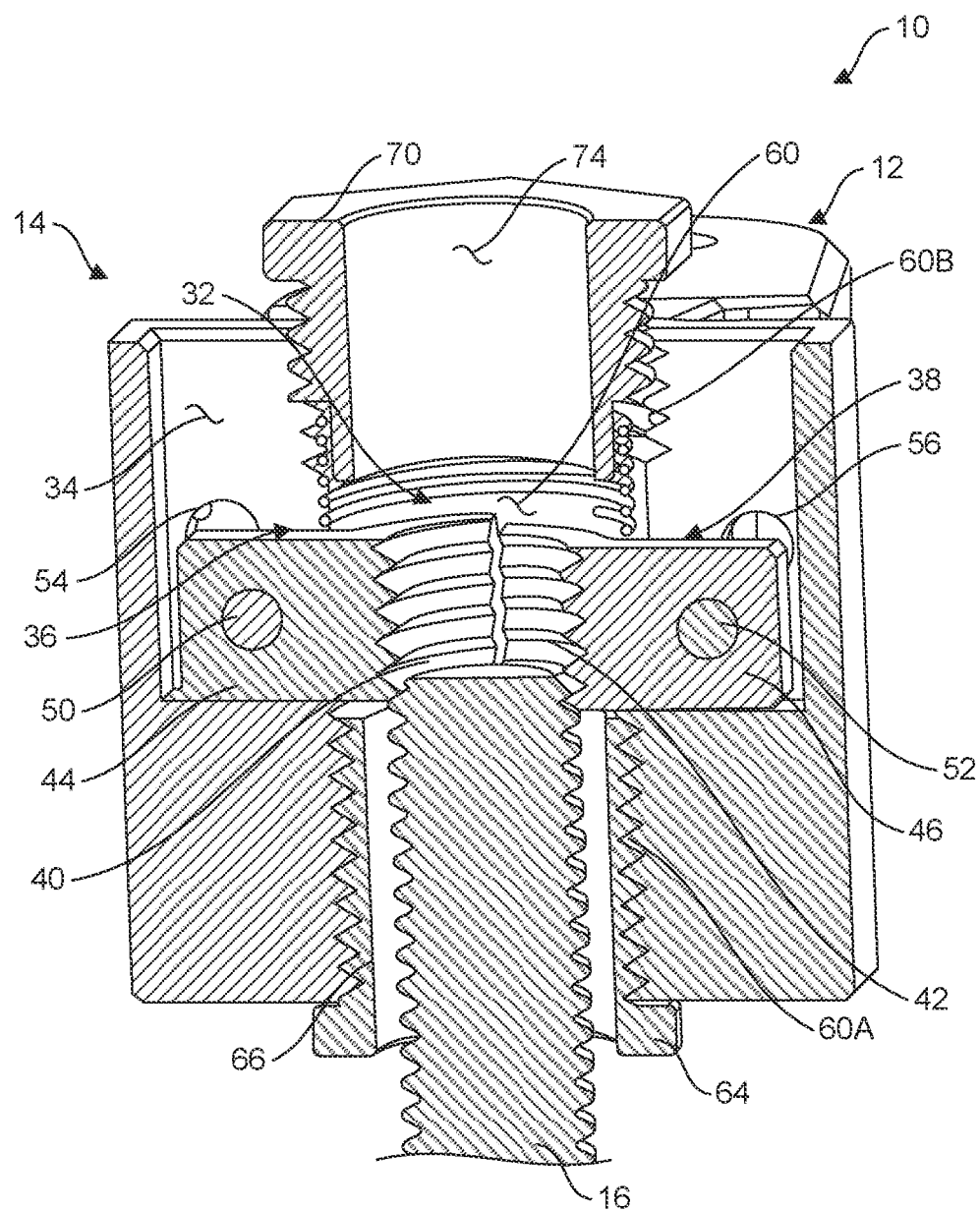
FIG. 3 is a cross section of the structural fastener and threaded rod partially inserted into the structural fastener.
Figure 4:
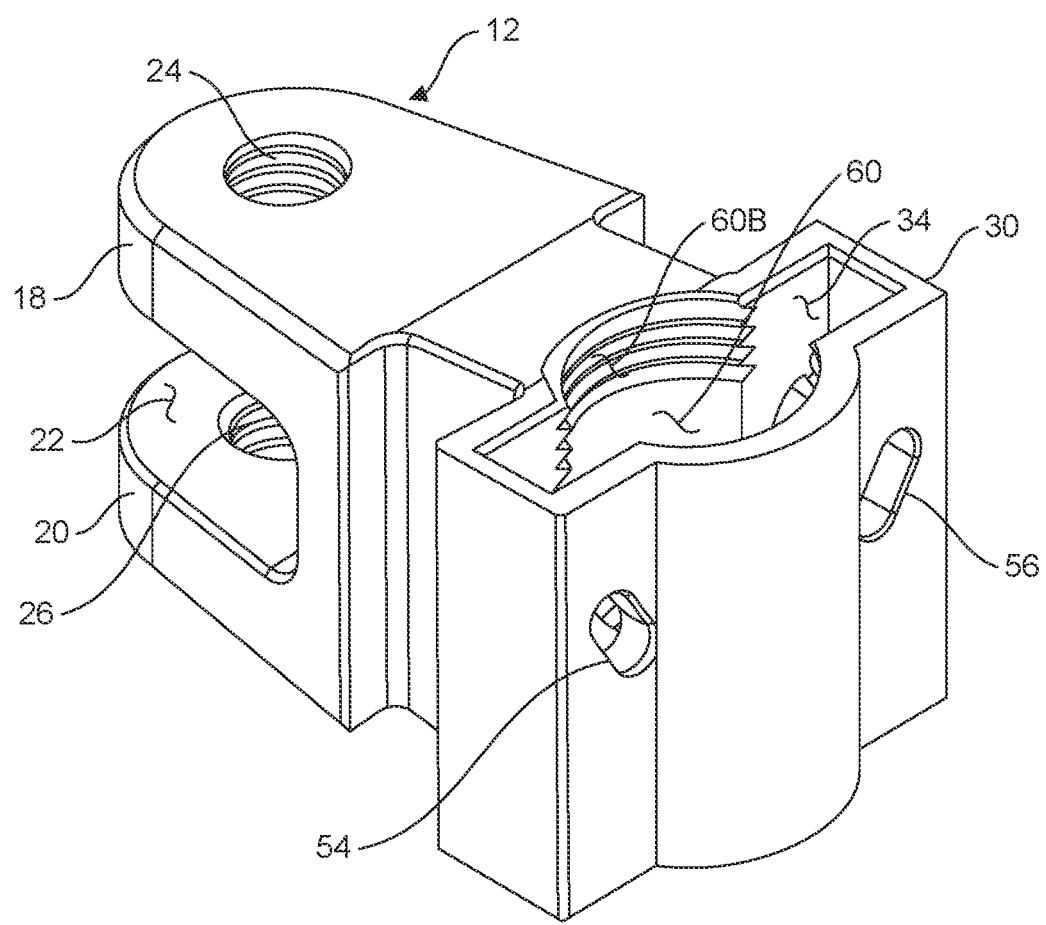
FIG. 4 is a perspective of a structure coupler and housing of a threaded rod coupler.
Figure 5:
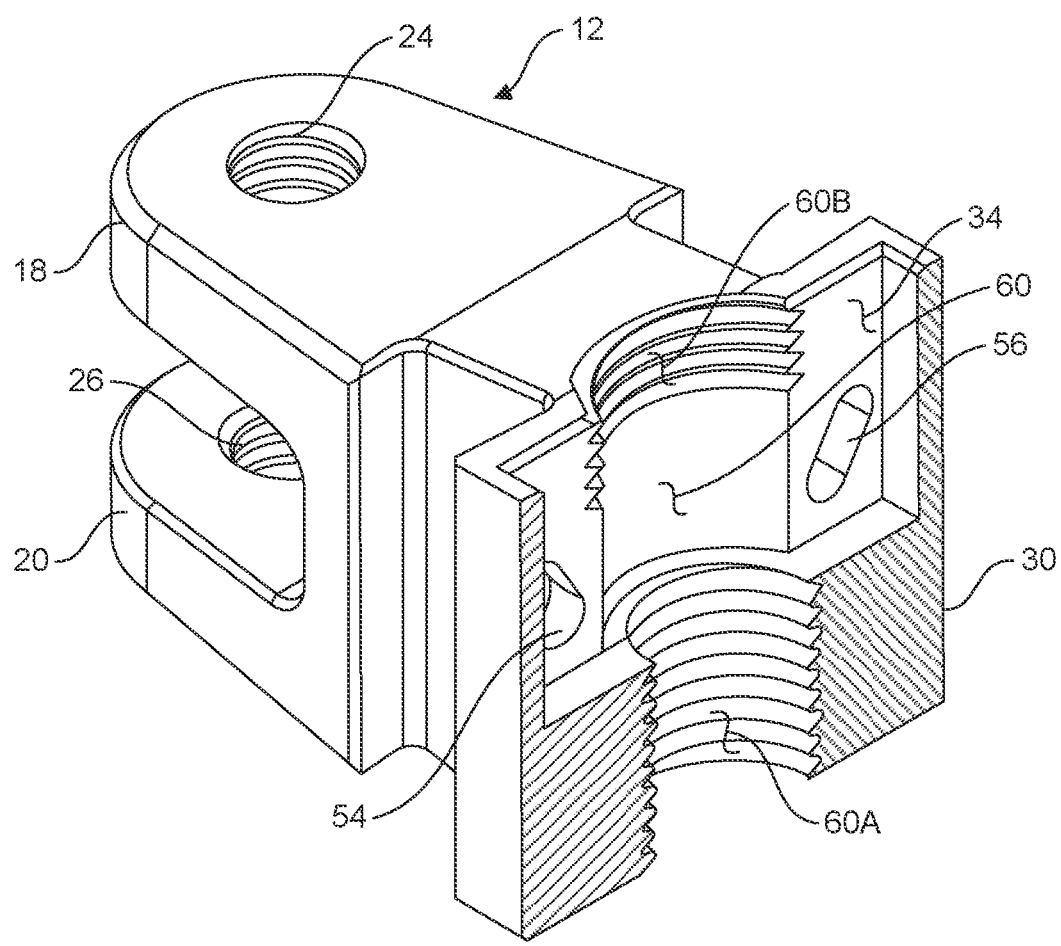
FIG. 5 is similar to FIG. 4 with a section taken through the housing of the threaded rod coupler.
Figure 6:
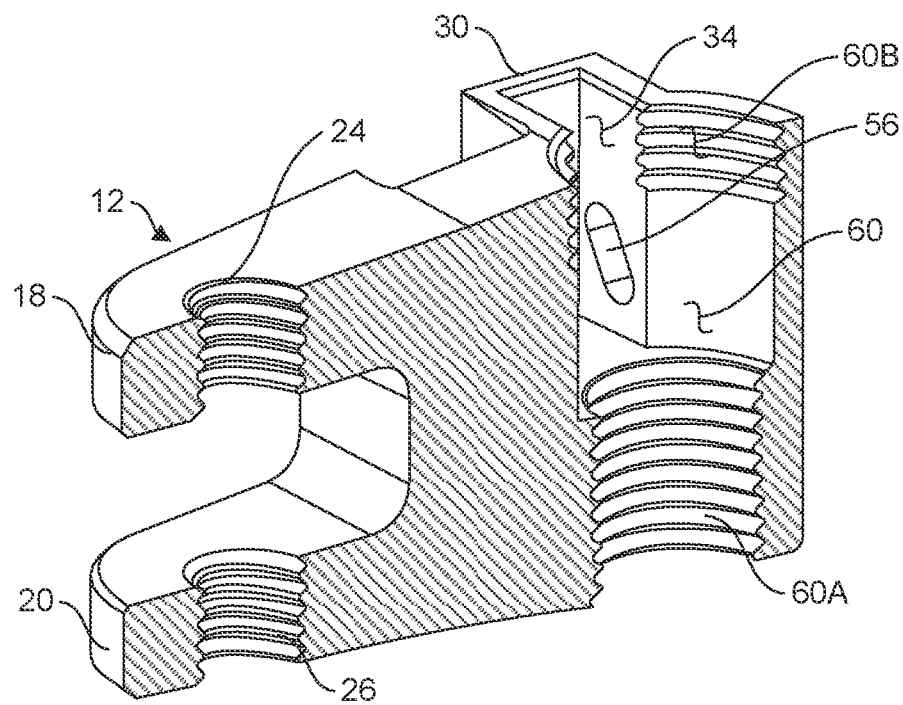
FIG. 6 is a perspective of the structure coupler and housing with a section taken therethrough.
Figure 7:
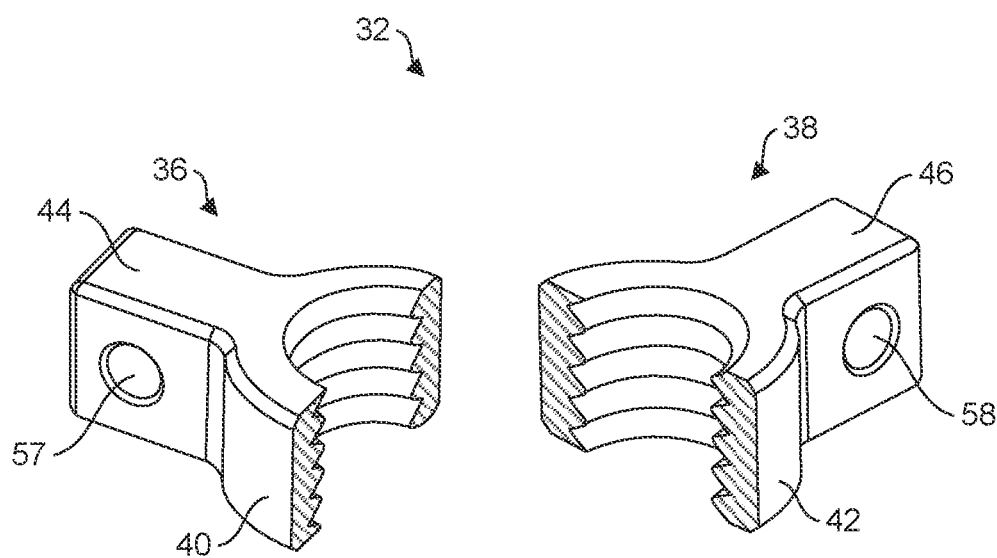
FIG. 7 is perspective of a split nut of the threaded rod coupler.
Figure 8:
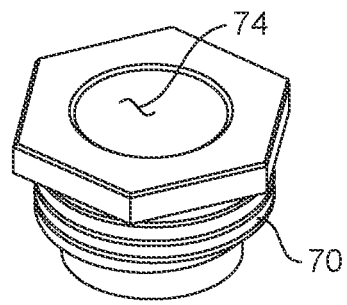
FIG. 8 is a perspective of a lock of the threaded rod coupler.
Figure 9:
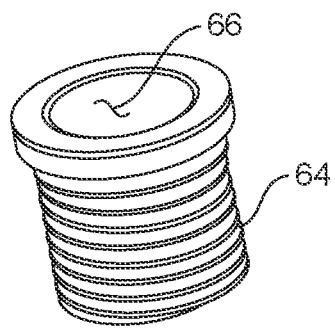
FIG. 9 is a perspective of a bushing of the threaded rod coupler.
Figure 10:
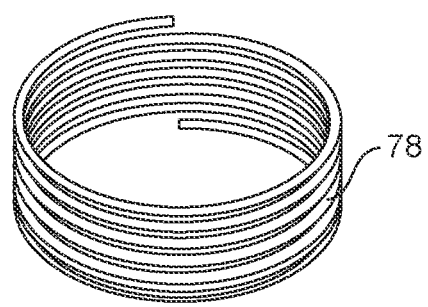
FIG. 10 is a spring of the threaded rod coupler.
Figure 11:
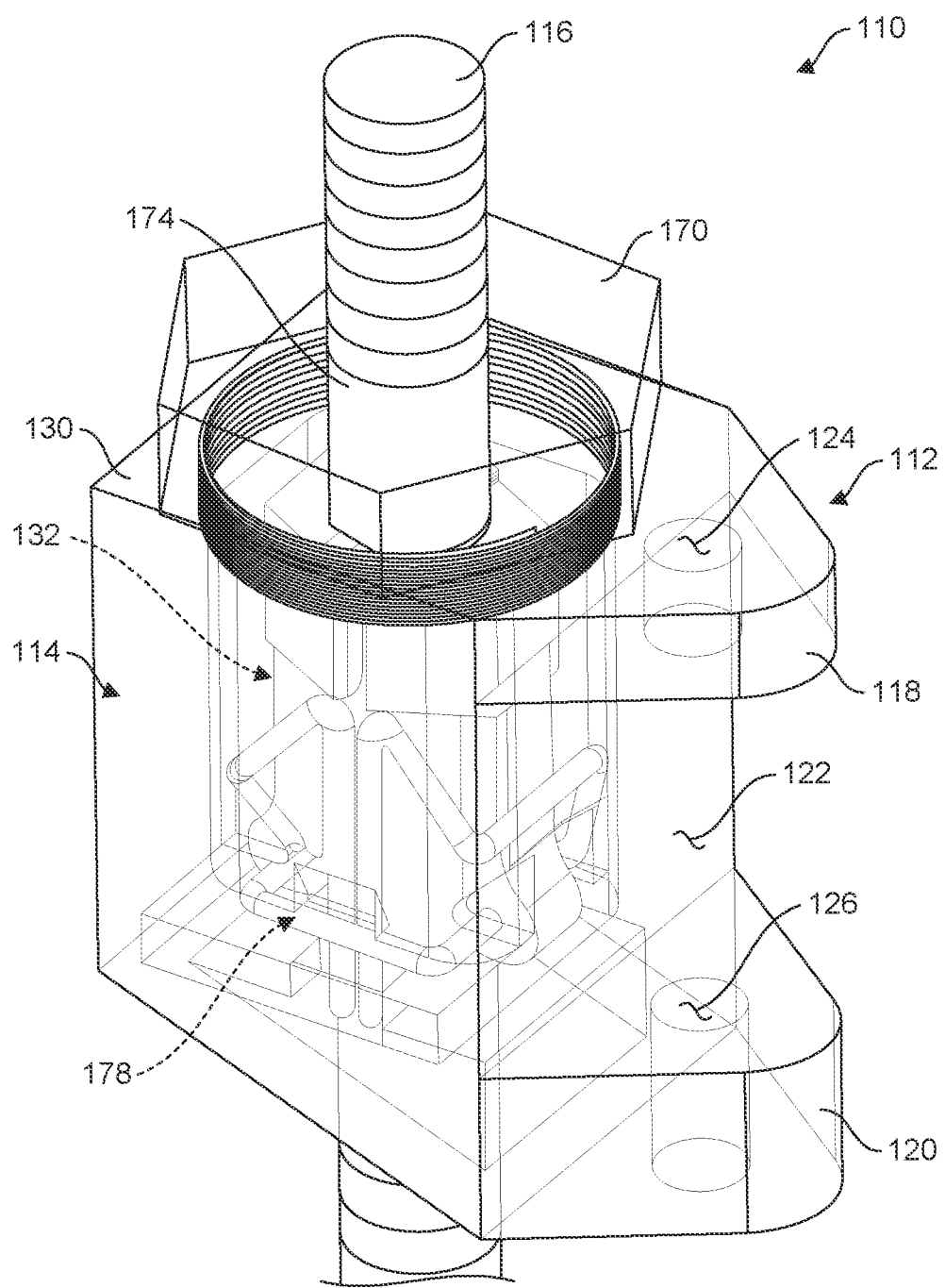
FIG. 11 is a perspective of another embodiment of a structural fastener coupled to a threaded rod.
Figure 12:
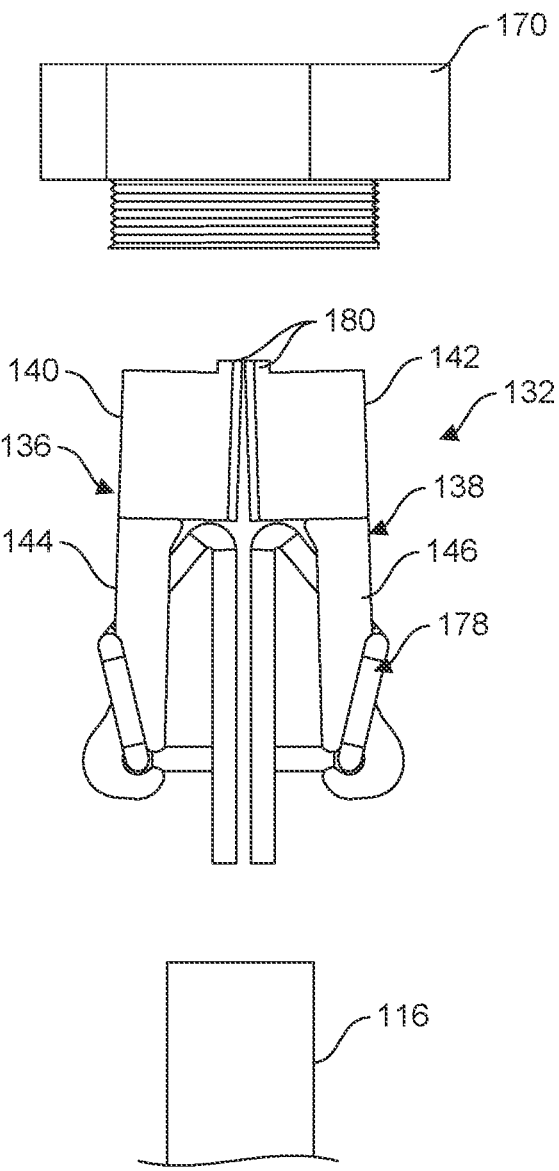
FIG. 12 is an exploded view of a lock, a split nut, a spring, and a threaded rod.
Figure 13:
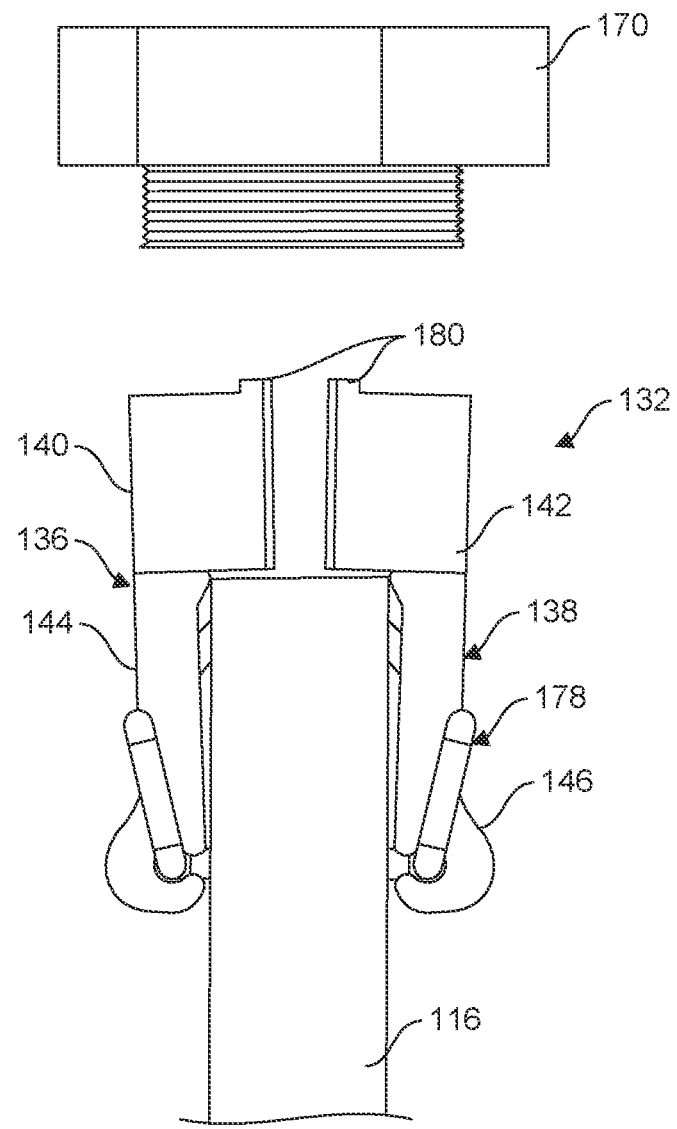
FIG. 13 is similar to FIG. 12 showing the threaded rod received in the split nut.
Figure 14:
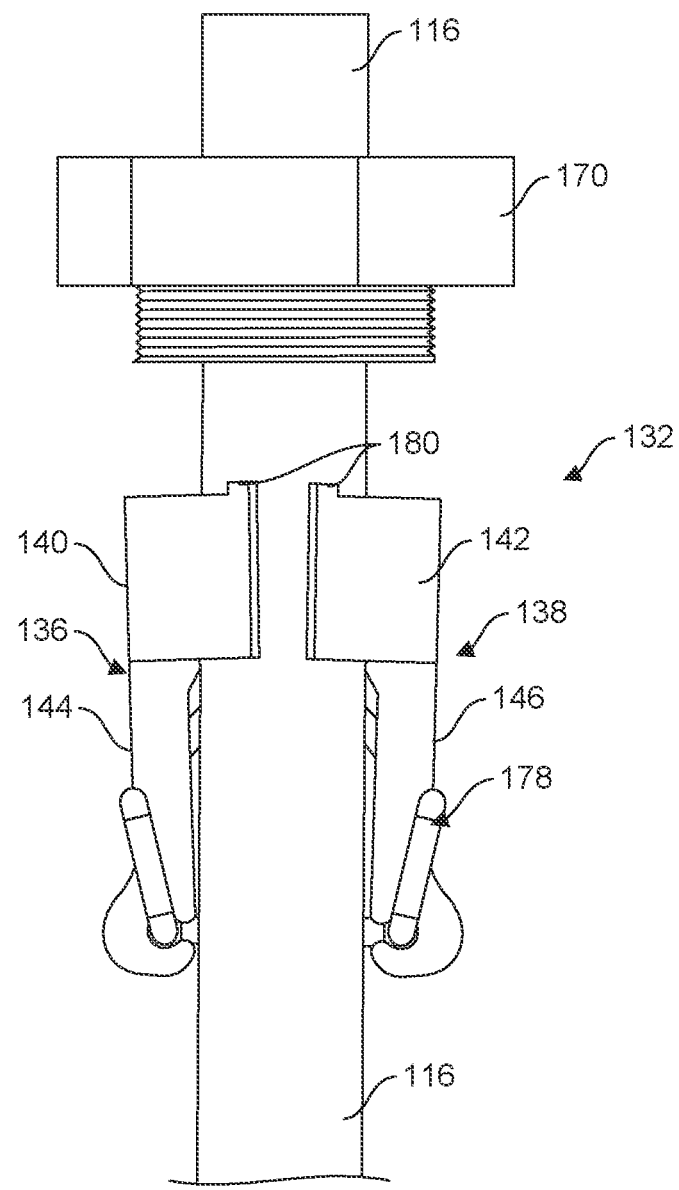
FIG. 14 is similar to FIG. 13 showing the threaded rod fully inserted through the split nut.
Figure 15:
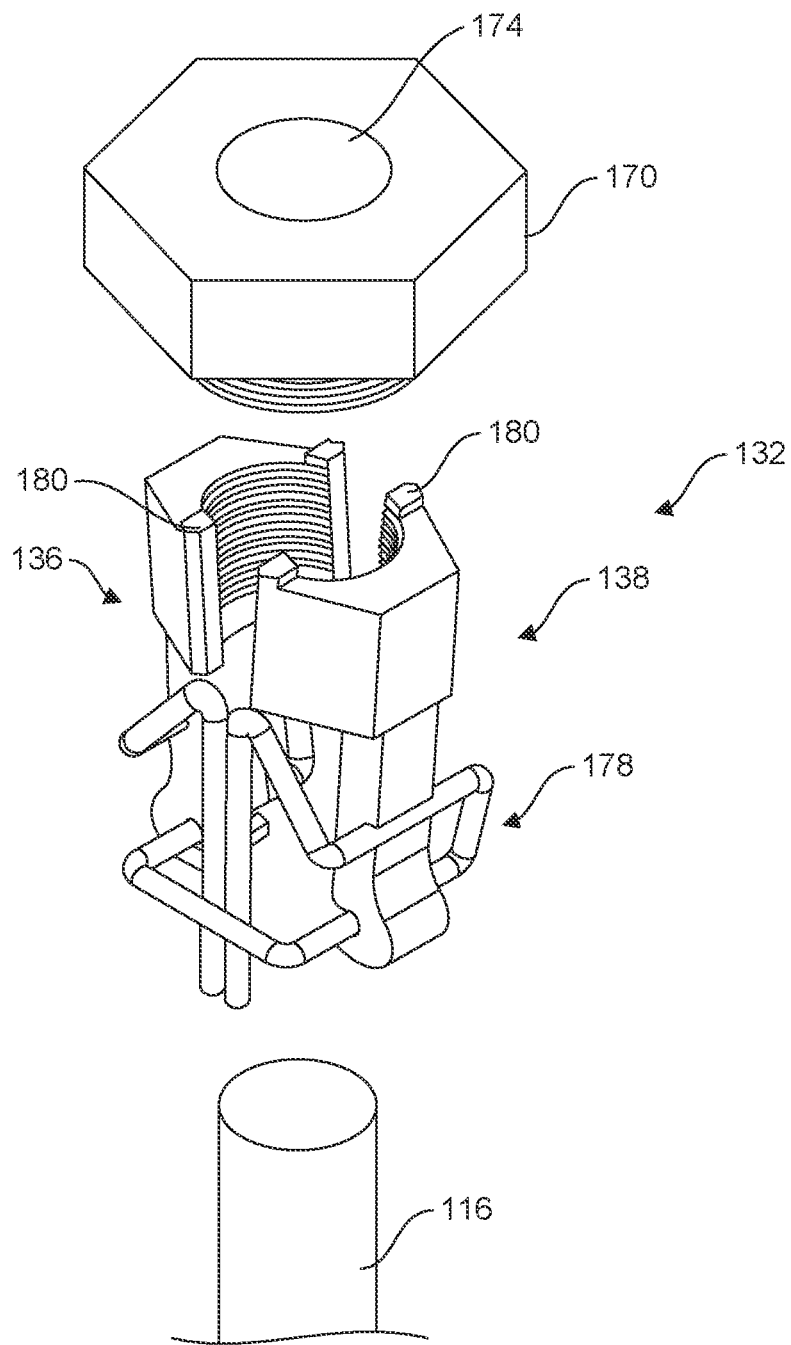
FIG. 15 is a perspective similar to FIG. 12.

The threaded rod coupler 14 provides quick-connect coupling to the threaded rod 16 (e.g., the all threaded rod). To couple the threaded rod 16 to threaded rod coupler 14, the lock 70 is initially loosened such that the spring 78 biases the split nut 32 in its closed position. The threaded rod 16 is inserted into the bushing 64 in the lower portion 60A of the through opening 60 and the end of the threaded rod engages a lower surface of the split nut, as shown in FIG. 3. Continued insertion of the threaded rod 16 through the bushing 64 pushes the nut portions 36, 38 upward against the force of the spring 78 so that the split nut 32 opens to slidably receive the threaded rod axially therein. The end of the threaded rod 16 enters the through passage 74 of the lock 70 as the threaded rod is pushed through the threaded rod coupler 14. Once the structural fastener 10 is slid on the threaded rod 16 to the desired longitudinal position, the lock 70 is tightened to inhibit the split nut 32 from opening. The structural fastener 110 threadably engages the threaded rod 116 and can be rotated on the threaded rod 16 to further move the structural fastener to a desired longitudinal position on the threaded rod.

Second Embodiment

Referring to FIGS. 11-20, another embodiment of a structural fastener constructed according to the teachings of the present disclosure is generally indicated at reference numeral 110. The structural fastener 110 includes a structure coupler, generally indicated at 112, and a threaded rod coupler, generally indicate at 114, configured to threadably couple to a threaded rod 116. The structure coupler 112 of the illustrated structural fastener 110 comprises a beam clamp configured to couple to a structural beam (not shown). It is understood that in other embodiments, the structure coupler may be other types of couplers configured to couple to other load-bearing structural components. The illustrated beam clamp 112 includes opposing, spaced apart first and second jaws 118, 120 (i.e., upper and lower jaws as illustrated in the drawings) defining a jaw space 122 therebetween configured to receive a flange of a beam therein. At least one of the first and second jaws 118, 120 (e.g., each of the jaws) defines a threaded opening 124, 126 configured to threadably receive a set screw (not shown) therein. The set screw is configured to engage the flange of the beam received in the jaw space 122 upon tightening the set screw to couple the beam clamp 112 to the beam. The illustrated jaws 118, 120 are generally rigid and extend outward (e.g., are cantilevered) from the threaded rod coupler 114. The beam clamp may be of other constructions, such as a beam clamp including resiliently deflectable jaws that snap into the beam.

The threaded rod coupler 114 includes housing 130, and a split nut, generally indicated at 132, captured within a cavity 134 (FIG. 20) of the housing 130. The housing 130 is attached to the structure coupler 112 and may be integrally formed therewith. As an example, the housing 130 and the structure coupler 12 may be made from metal, such as by casting, forging, cutting, and other metal working processes. The split nut 132 comprises separate first and second nut portions, generally indicated at 136, 138 (e.g., first and second nut halves). Each nut portion 136, 138 includes a nut body 140, 142 that is internally threaded, and a nut arm 144, 146 extending outward from the body. The nut bodies 140, 142 generally oppose one another within the housing 130 and are movable toward and away from one another (rotatable laterally outward, as illustrated) to open and close the split nut 132 when inserting the threaded rod 116 into the threaded rod coupler 114, as described in more detail below. When closed, the inner diameter of the split nut 132 is suitable for the split nut to be threadably received on the threaded rod 116. A spring (e.g., a wire spring), generally indicated at 178, received in the cavity 134 of the housing 130 biases the split nut 132 in its closed position (i.e., biases the nut bodies 140, 142 toward one another). The illustrated nut arms 144, 146 pivot or rotate about axes to allow the split nut 132 to open and close. In the illustrated embodiment, the nut arms 144, 146 are pivotally coupled to the spring 178 (e.g., a wire arm of the spring), although the nut arms may be pivotably movable in other ways. The nut arms 144, 146 may be snap-fitting on the wire spring 178.

A through opening 160 for receiving the threaded rod 116 extends through the housing 130 and the cavity 134 and is generally aligned with the axis of the inner diameter of the split nut 132. A lock 170 is threaded in an upper portion 160B of the through opening 160 above the split nut 132, as illustrated. The lock 170 defines a through passage 174 (FIG. 11) generally aligned with the through opening 160. When the lock 170 is threadably loosened in the through opening 160, the split nut 132 is capable of moving to its open position against the force of the spring 178. When the lock 170 is threadably tightened in the through opening 160, the split nut 132 is fixed in its closed position and inhibited from opening. In particular, when the lock 170 is tightened, tabs 180 on the split nut 132 enter the through passage of the lock 174 (FIG. 17) to inhibit the nut bodies 140, 142 from moving away from one another within the housing 130. The lock 170 may be formed from plastic or other material.

Figure 16:
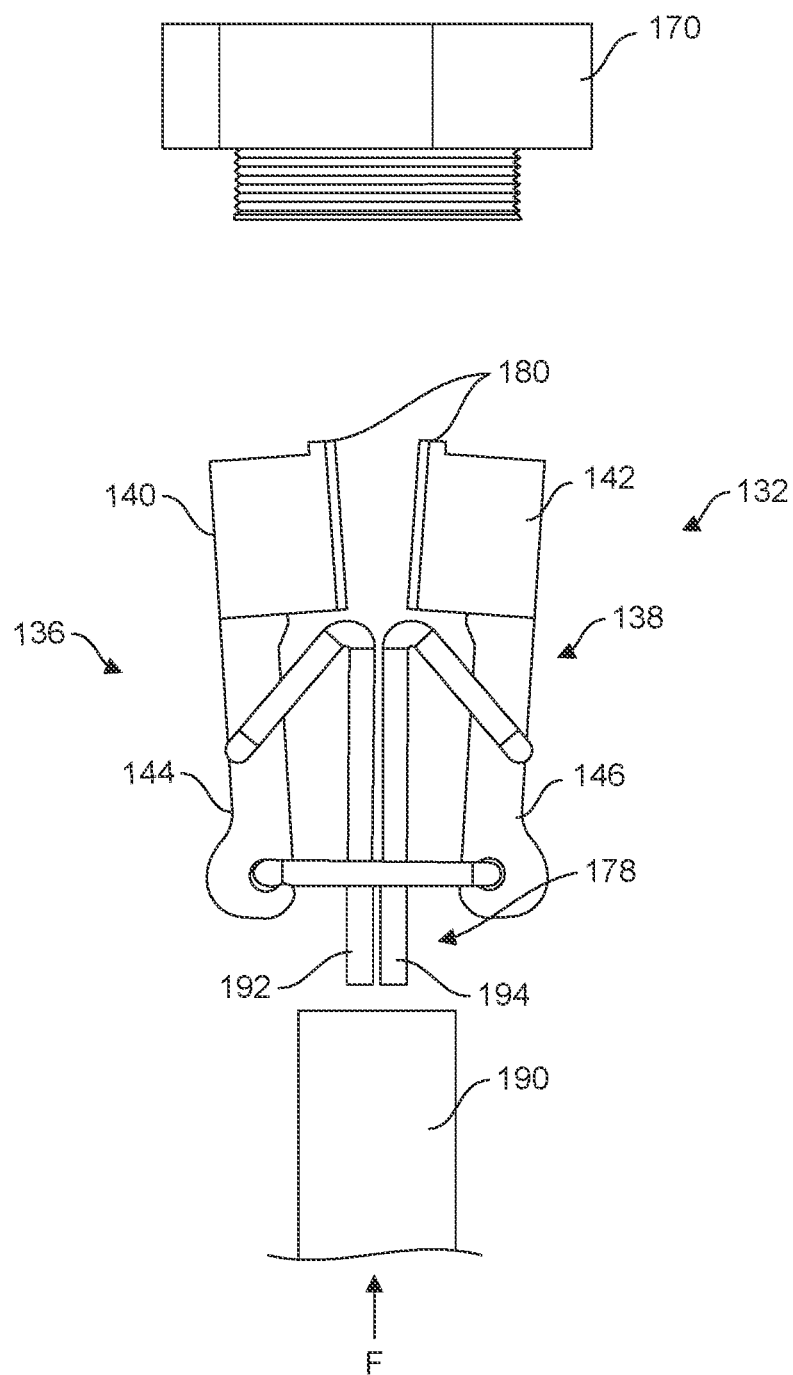
FIG. 16 illustrates a tool opening the split nut.
Figure 17:
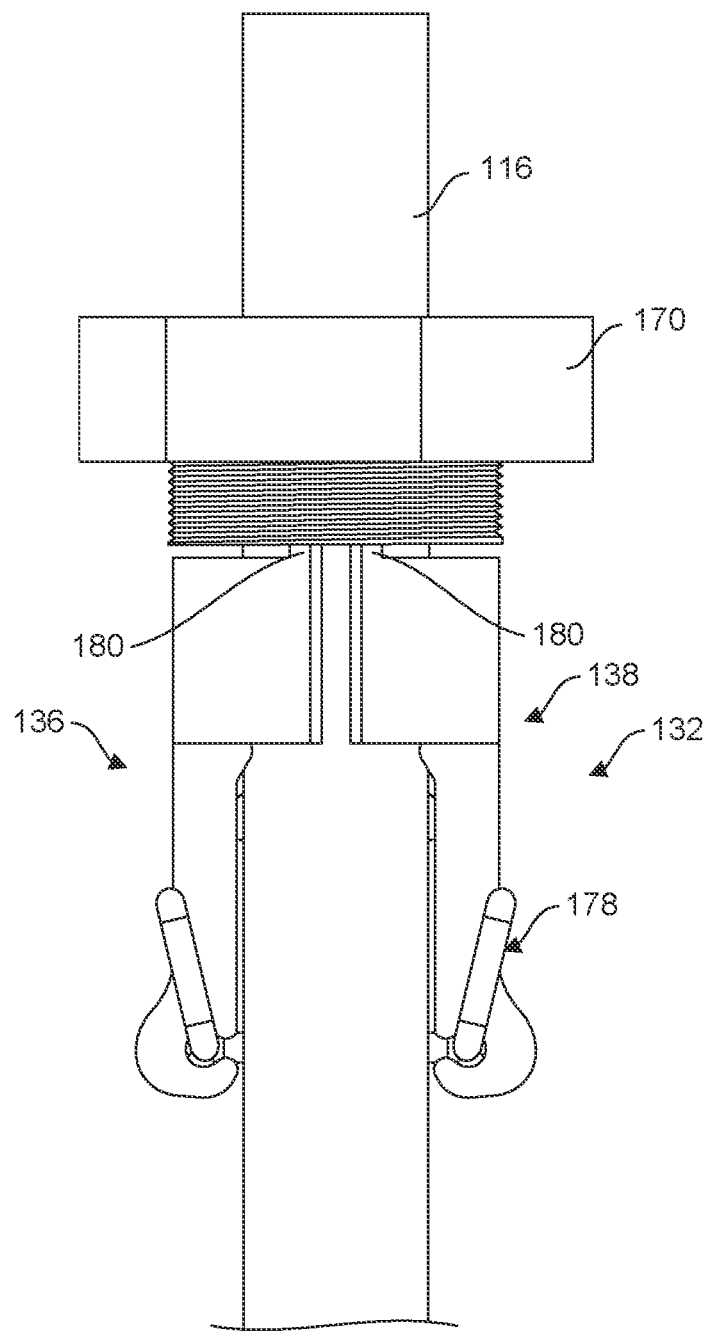
FIG. 17 is similar to FIG. 12 showing the lock engaging split nut to inhibit opening of the split nut.
Figure 18:
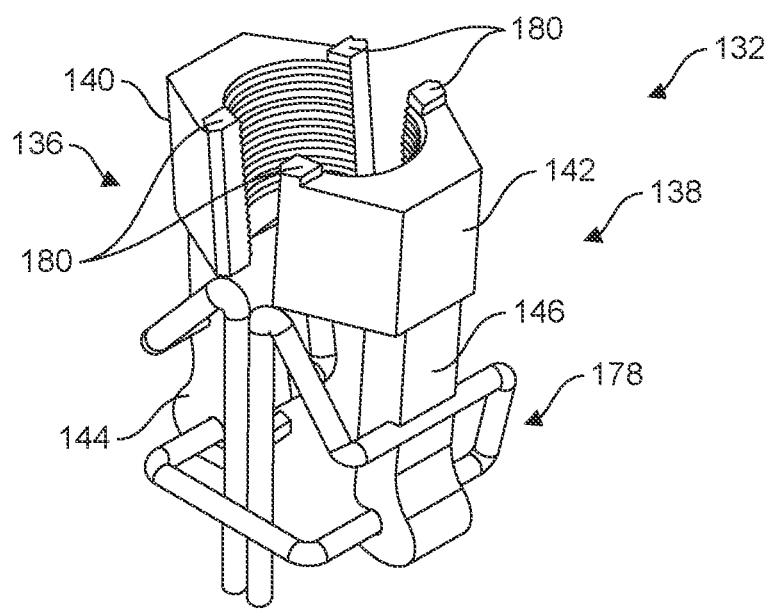
FIG. 18 is a perspective of the split nut and spring.
Figure 19:
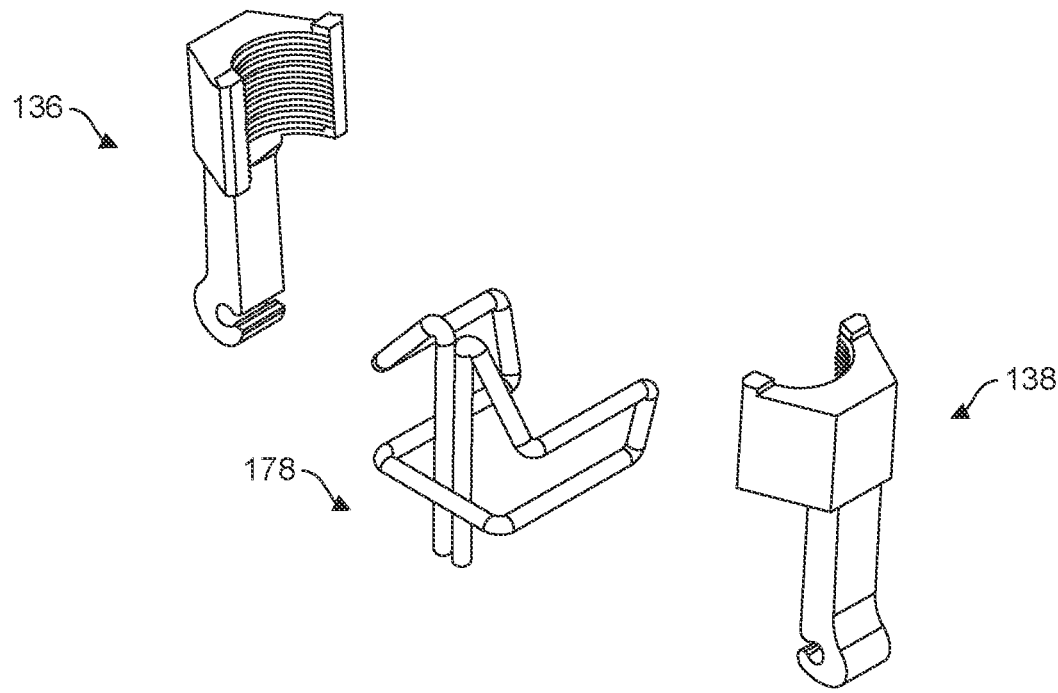
FIG. 19 is an exploded view of FIG. 18.
Figure 20:
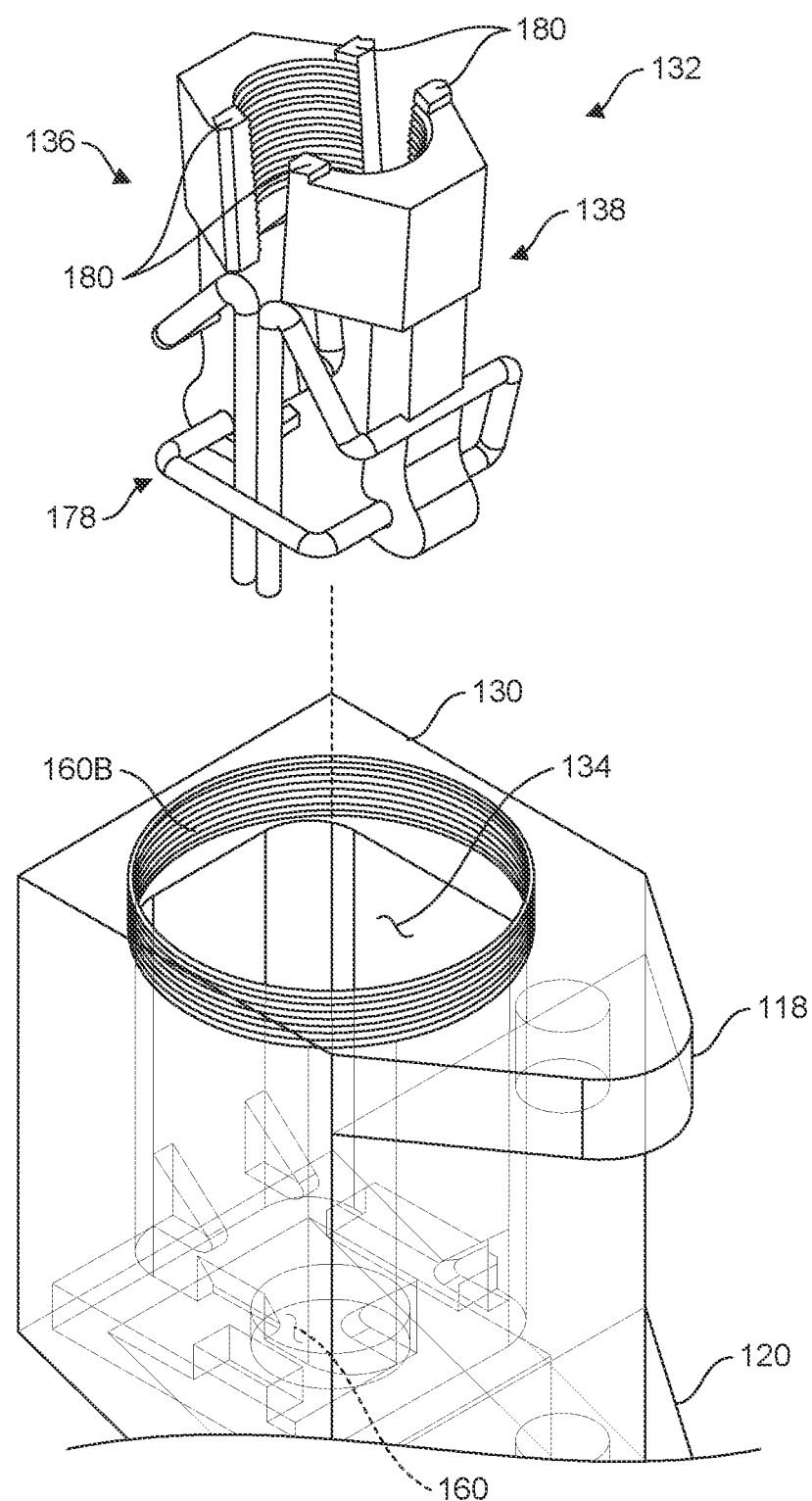
FIG. 20 is a perspective of the split nut and spring removed from the housing.
Figure 21:
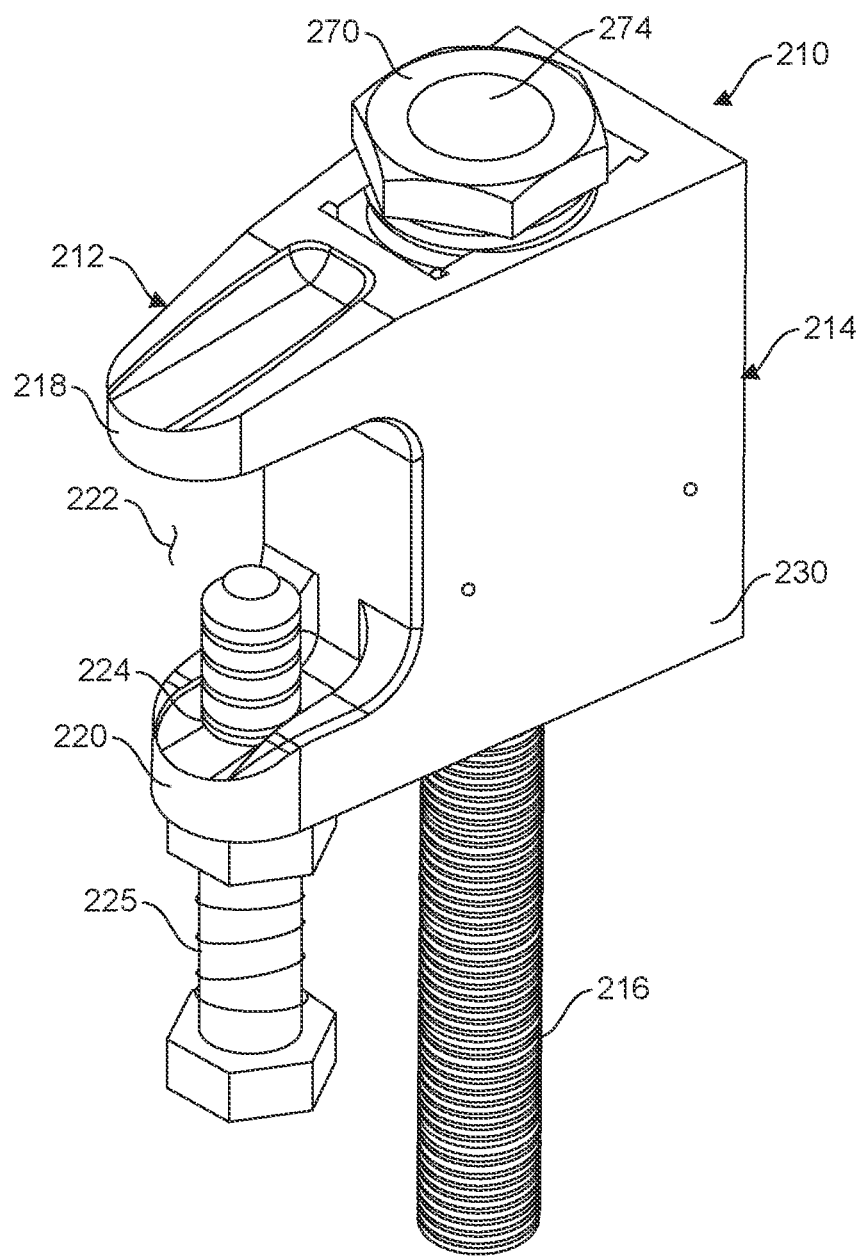
FIG. 21 is a perspective of a third embodiment of a structural fastener coupled to a threaded rod.

The threaded rod coupler 114 provides quick-connect coupling to the threaded rod. To couple the threaded rod 116 to threaded rod coupler 114, the lock 170 is initially loosened such that the spring 178 biases the split nut 132 in its closed position and the split nut is allowed to open. The threaded rod 116 is inserted into the through opening 160 via a bottom opening in the housing 130. The end of the threaded rod 116 engages a lower surface of the split nut 132. Continued insertion of the threaded rod 116 into the through opening 160 pushes the nut bodies 140, 142 to pivot about the pivot connection of the nuts arms 144, 146, against the force of the spring 178, so that the split nut 132 opens to slidably receive the threaded rod axially therethrough. The end of the threaded rod 116 slidably enters the through passage 174 of the lock 170 as the threaded rod is pushed through the threaded rod coupler 114 to threadably engage the rod. Once the structural fastener 110 is slid on the threaded rod 116 to the desired location, the lock 170 is tightened to inhibit the split nut 132 from opening. The structural fastener 110 threadably engages the threaded rod 116 and can be rotated on the threaded rod 116 to further move the structural fastener to a desired longitudinal position on the threaded rod. As shown in FIG. 16, the threaded rod coupler 114 may be disengaged from the threaded rod 116 by inserting a tool 190 into the housing 130 and engaging depending arms 192, 194 of the spring 178. Pushing upward on the arms 192, 194 opens the spring 178 and, in turn, opens the split nut 132.

Third Embodiment

Referring to FIGS. 21-30, another embodiment of a structural fastener constructed according to the teachings of the present disclosure is generally indicated at reference numeral 210. As seen generally in FIGS. 21 and 22, the structural fastener 210 includes a structure coupler, generally indicated at 212, and a threaded rod coupler, generally indicate at 214, configured to threadably couple to a threaded rod 216. The structure coupler 212 of the illustrated structural fastener 210 comprises a beam clamp configured to couple to a structural beam (not shown). It is understood that in other embodiments, the structure coupler may be other types of couplers configured to couple to other load-bearing structural components. The illustrated beam clamp 212 includes opposing, spaced apart first and second jaws 218, 220 (i.e., upper and lower jaws as illustrated in the drawings) defining a jaw space 222 therebetween configured to receive a flange of a beam therein. At least one of the first and second jaws 218, 220 (e.g., jaw 220) defines a threaded opening 224 configured to threadably receive a set screw 225 (FIG. 21) therein. The set screw 225 is configured to engage the flange of the beam received in the jaw space 222 upon tightening the set screw to couple the beam clamp 212 to the beam. The illustrated jaws 218, 220 are generally rigid and extend outward (e.g., are cantilevered) from the threaded rod coupler 214. The beam clamp may be of other constructions, such as a beam clamp including resiliently deflectable jaws that snap into the beam.

Figure 22:
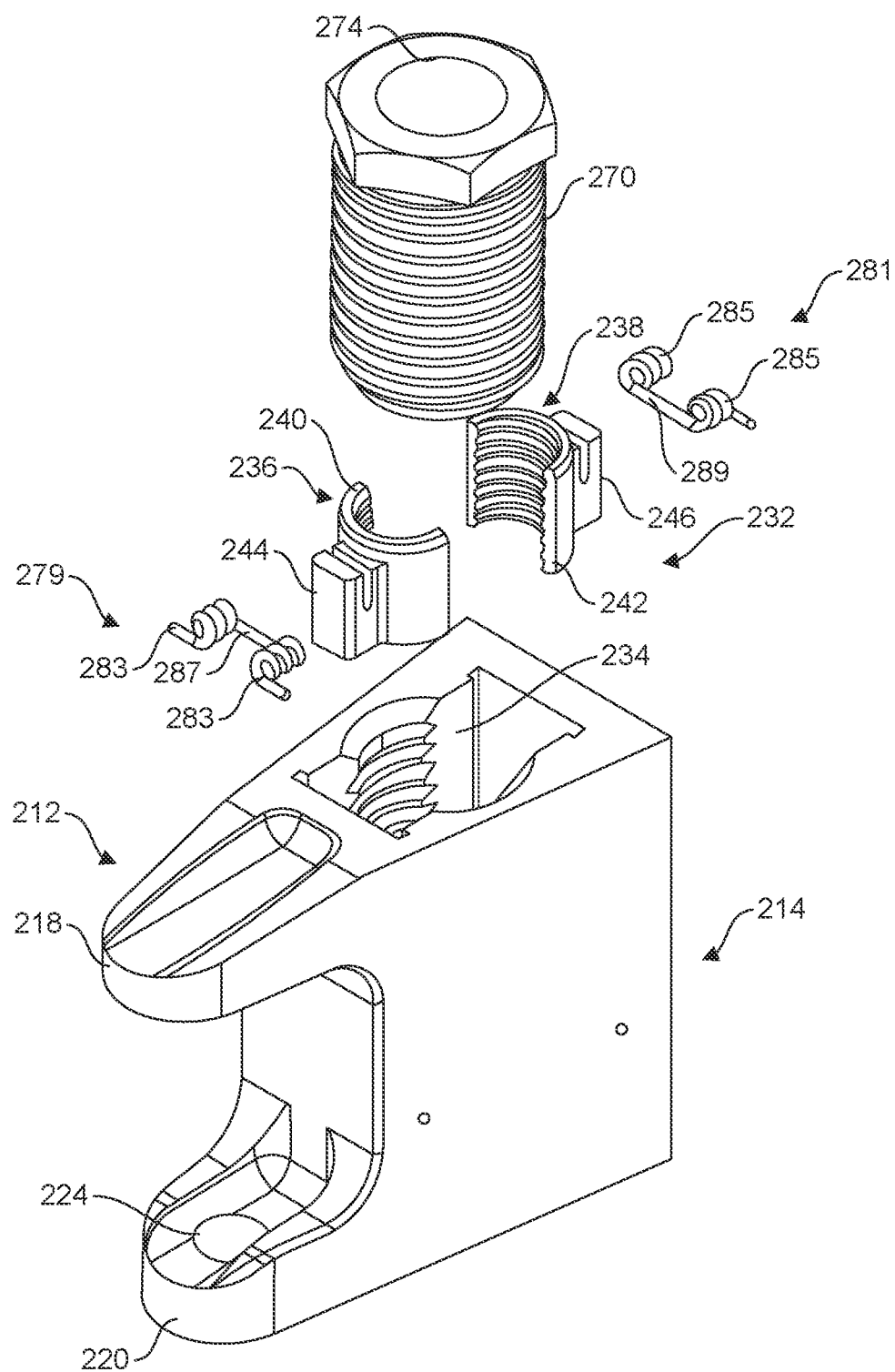
FIG. 22 is an exploded view of the structural fastener of FIG. 21.

Referring to FIG. 22, the threaded rod coupler 214 includes housing 230, and a split nut, generally indicated at 232, captured within a cavity 234 of the housing. The housing 230 is attached to the structure coupler 212 and may be integrally formed therewith. As an example, the housing 230 and the structure coupler 212 may be made from metal, such as by casting, forging, cutting, and other metal working processes. The split nut 232 comprises separate first and second nut portions, generally indicated at 236, 238 (e.g., first and second nut halves). Each nut portion 236, 238 includes a nut body 240, 242 that is internally threaded, and a nut arm 244, 246 extending outward from the body. The nut bodies 240, 242 generally oppose one another within the housing 230 and are laterally movable toward and away from one another to open and close the split nut 232 when sliding the threaded rod 216 into the threaded rod coupler 214, as described in more detail below. When closed, the inner diameter of the split nut 232 is suitable for the split nut to be threadably received on the threaded rod 216.

A through opening 260 for receiving the threaded rod 216 extends through the housing 230 and the cavity 234 and is generally aligned with the axis of the inner diameter of the split nut 232. The illustrated embodiment may include the bushing 64 of the first embodiment.

Figure 27:
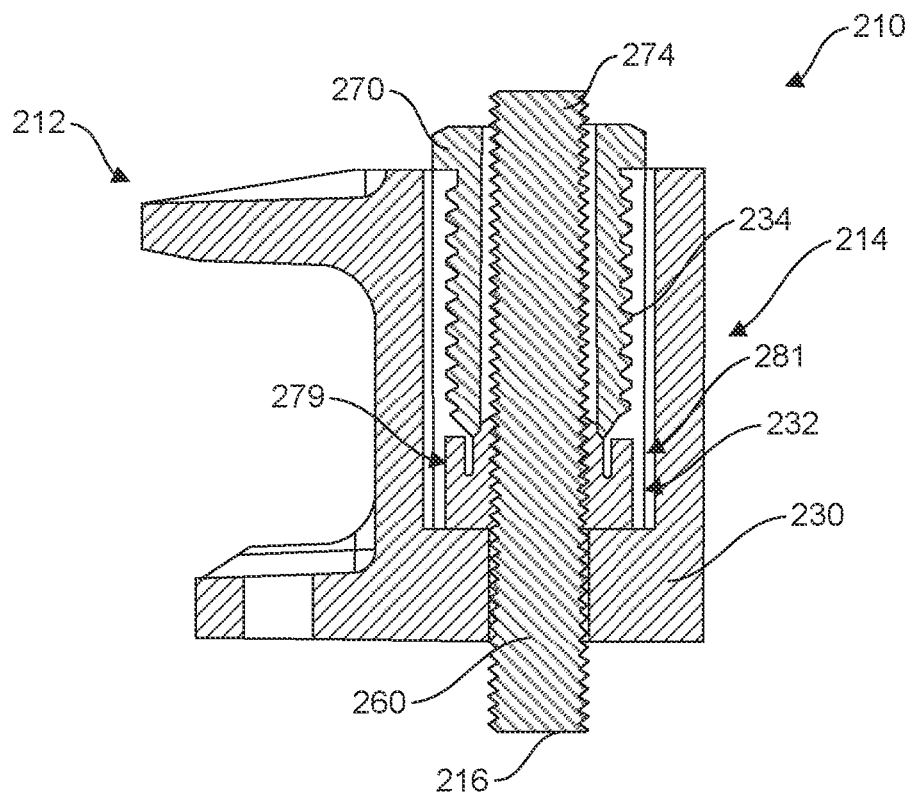
FIG. 27 is similar to FIG. 25 with the threaded rod fully inserted in the structural fastener and a lock in a locked position.
Figure 28:
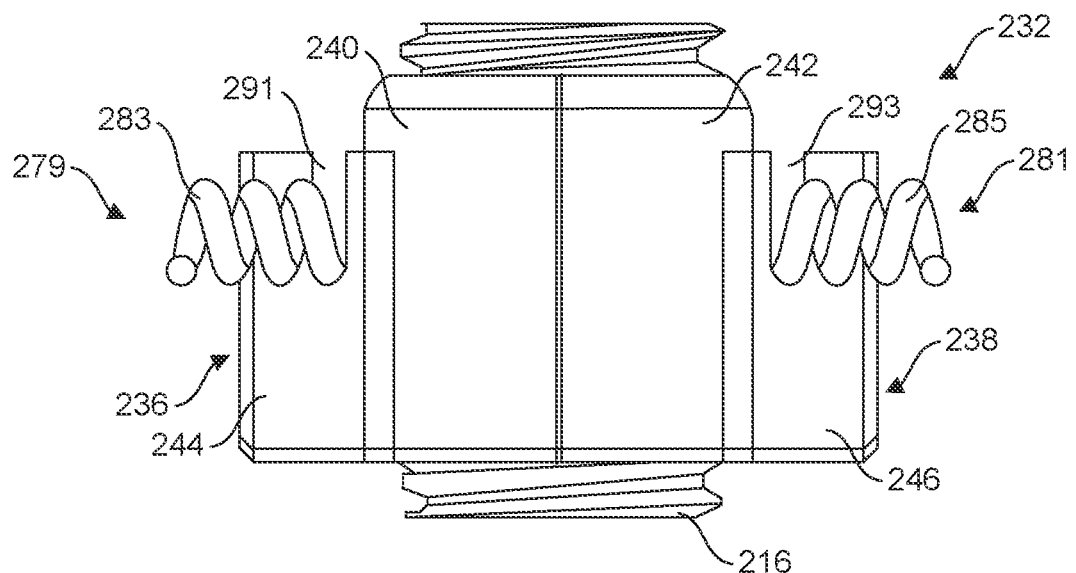
FIG. 28 is an enlarged view of the split nut in its position shown in FIG. 27.
Figure 29:
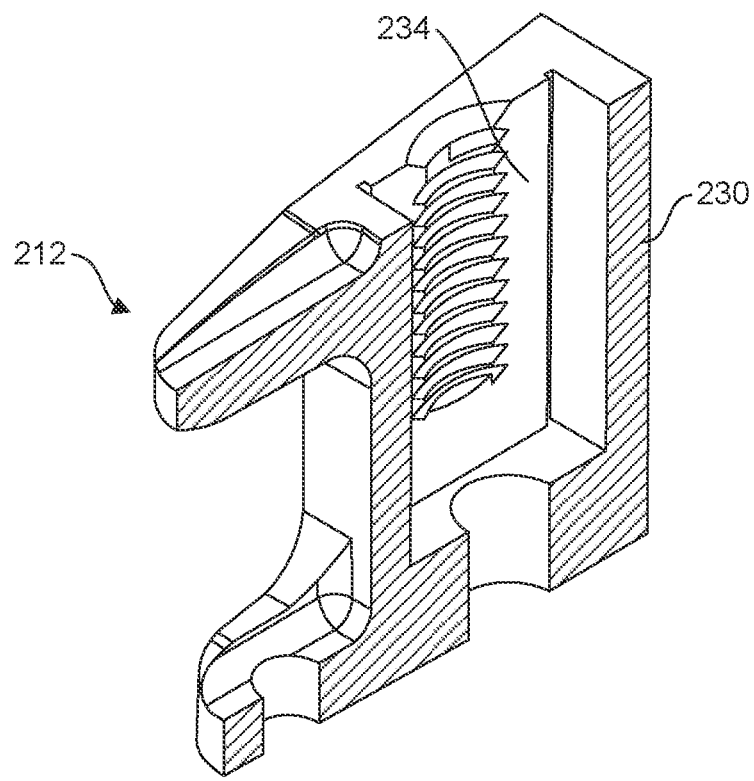
FIG. 29 is a cross section of a portion of the structural fastener.
Figure 30:
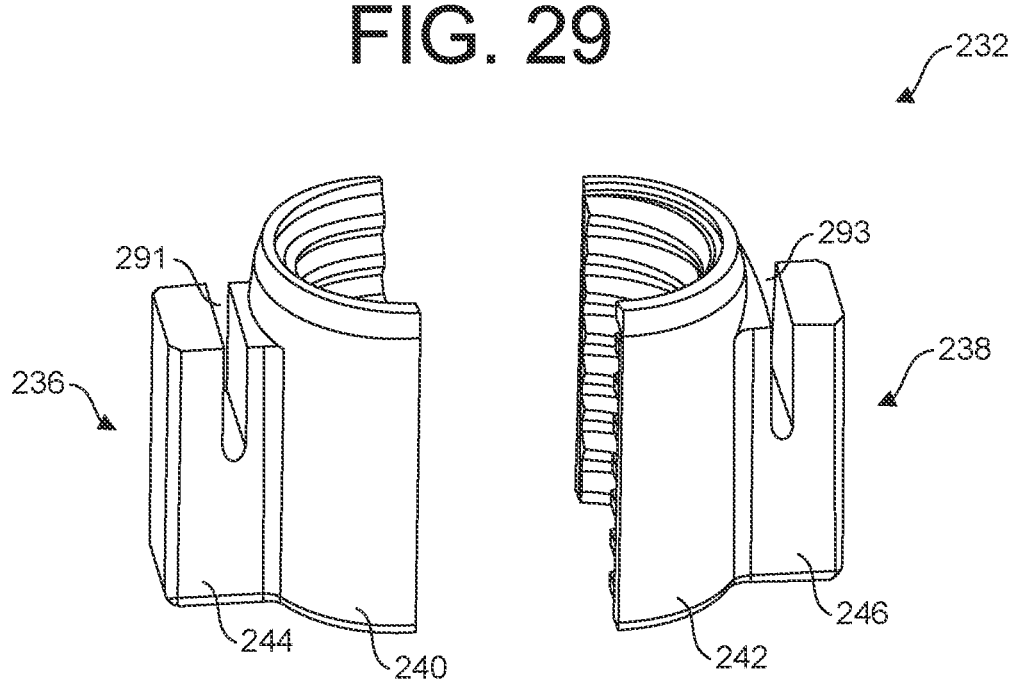
FIG. 30 is an enlarged perspective of the split nut.

A lock 270 for selectively locking the split nut 232 in its closed position is threaded in an upper portion 260B of the through opening 260 above the split nut 232, as illustrated. The lock 270 defines a through passage 274 generally aligned with the through opening 260. The illustrated lock 270 is generally in the form of a threaded fastener defining the through passage. As shown in FIG. 27, a longitudinal end of the threaded fastener 270 engages an upper portion of the split nut 232 in its closed position to inhibit the split nut 232 from opening (i.e., prevent the split nut portions from moving laterally away from one another). In the illustrated embodiment, the upper portion of the split nut 232 is received in the through passage 274 of the threaded fastener 270 at the distal end thereof. The upper portions of the split nut 232 may define a stop (such as shoulder) to limit the extent to which the upper portion of the split nut is receivable in the passage 274.

At least one spring (e.g., two springs) biases the split nut 232 to its closed position (i.e., biases the split nut portions toward one another). The illustrated embodiment includes first and second springs 279, 281, each biasing the corresponding one of the first and second split nut portions 236, 238. Each spring 279, 281 operatively engages the corresponding split nut portion 236, 238 and an interior surface of the housing 230 defining the cavity 234 to resiliently bias the splits nut portions toward one another (and toward the threaded rod when the threaded rod is received between the split nut portions). As shown in FIG. 22, each spring 279, 281 includes a two coiled, compression springs 283, 285, respectively, and a connecting arm 287, 289 or bar connecting the compression springs to one another. Each connecting arm 287, 289 is received in a corresponding slot or groove 291, 293 defined the nut arm 244, 246 of the respective one of the split nut portions 236, 238. Each compression spring 283, 285 may be staked or otherwise attached to the housing 230. Accordingly, the springs 279, 280 are coupled to the corresponding one of the split nut portions 236, 238 to apply the biasing force thereto. It is understood that in other embodiments the springs 283, 285 may be operatively coupled to the split nut portions 236, 238 for transferring the biasing force thereto in other ways.

When the lock 270 is threadably loosened in the through opening 260, the split nut 232 is biased in the closed position by force of the springs 279, 281 and the split nut can be moved to its open position against the force of the spring. That is, the lock 270 does not prevent the nut portions 236, 238 from moving laterally to open the split nut 232. When the lock 270 is threadably tightened in the through opening 260, the split nut 232 is fixed in its closed position (such as closed and threadably received on the threaded rod 216) and inhibited from opening. That is, the split nut 232 is closed and the nut portions 236, 238 are inhibited from moving within the housing 230 when the lock 270 is threadably tightened. The lock 270 may be formed from plastic or other material. The split nut 232 may be locked in its closed position in other ways.

Figure 23:
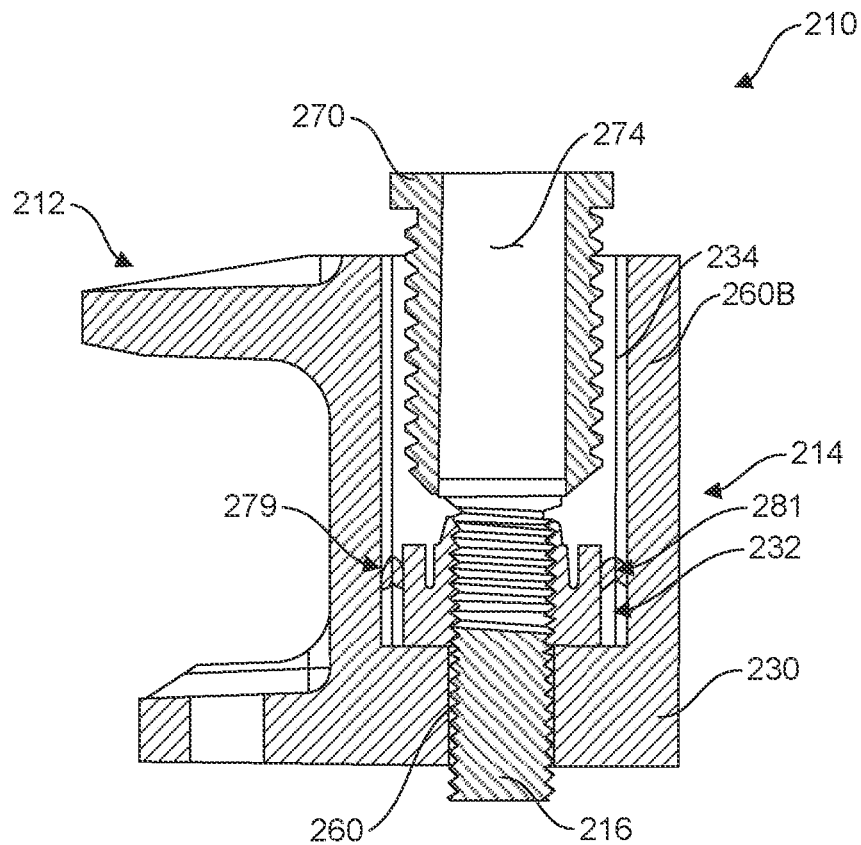
FIG. 23 is a cross section of the structural fastener of FIG. 21 showing a threaded rod initial being inserted into the structural fastener.
Figure 24:
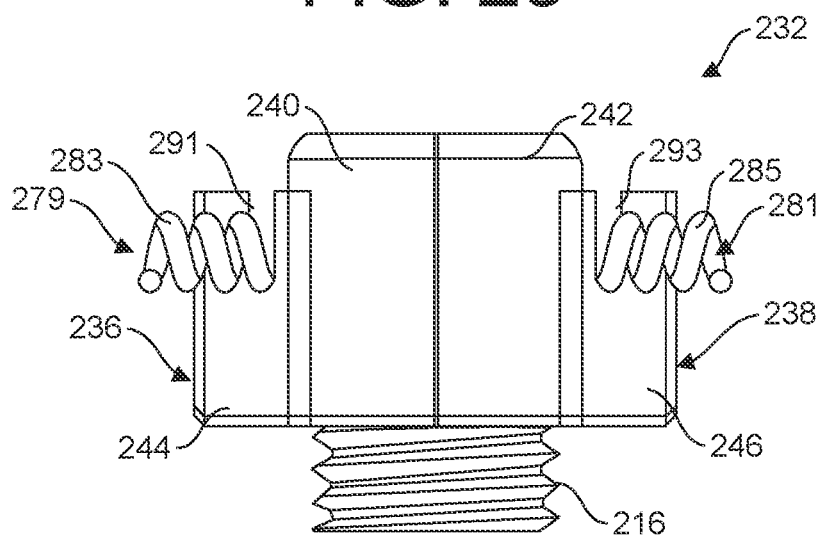
FIG. 24 is an enlarged view of a split nut in its position shown in FIG. 23.
Figure 25:
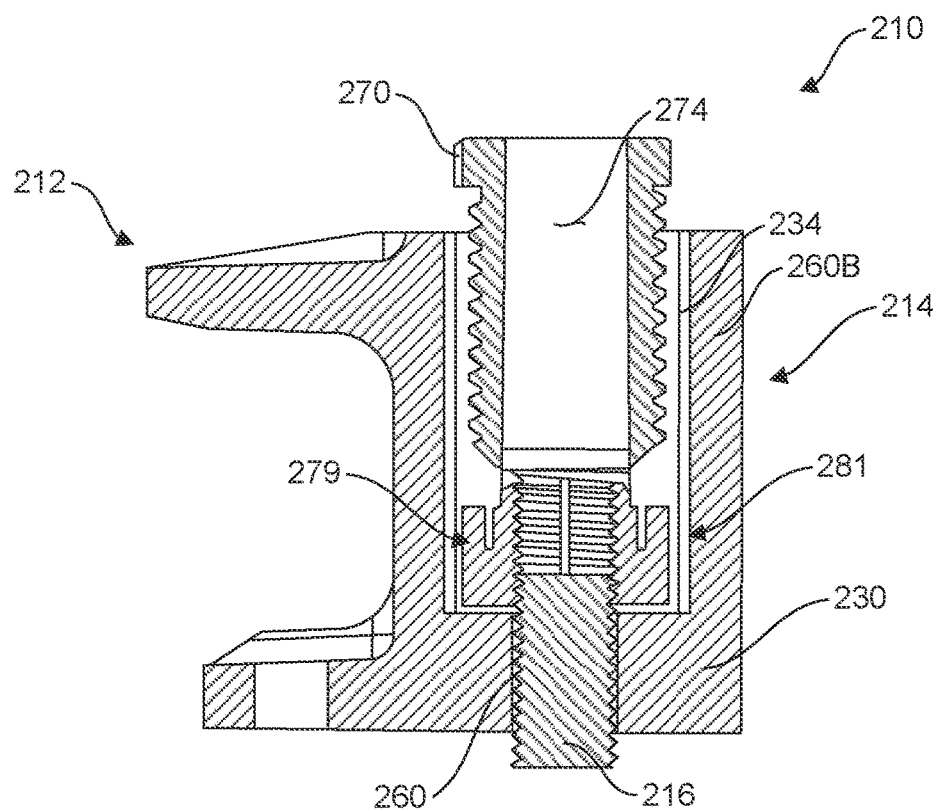
FIG. 25 is similar to FIG. 23 with the threaded rod partially inserted in the structural fastener.
Figure 26:
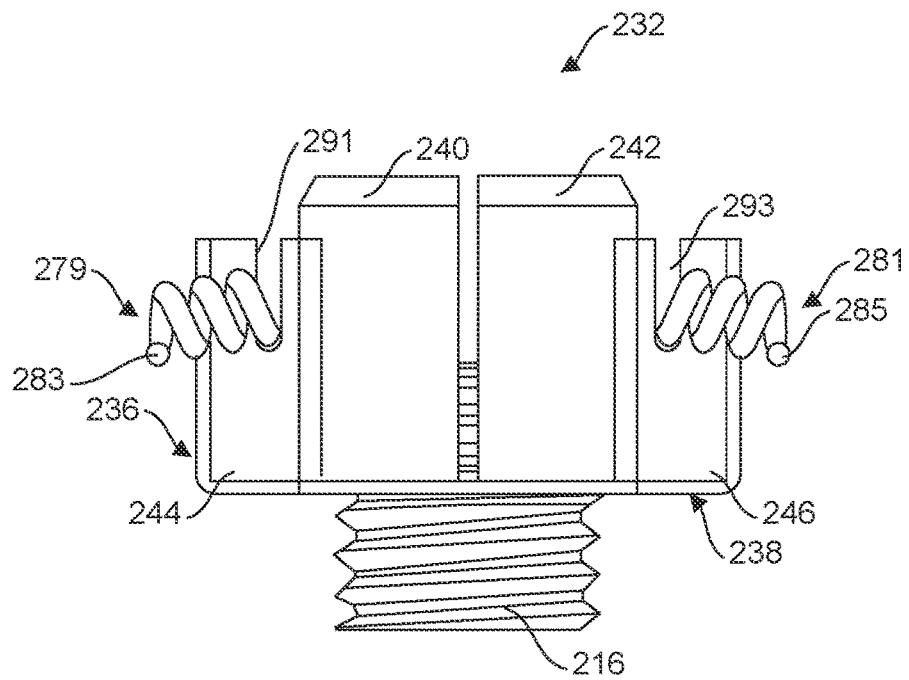
FIG. 26 is an enlarged view of the split nut in its position shown in FIG. 25.

The threaded rod coupler 214 provides quick-connect coupling to the threaded rod 216 (e.g., the all threaded rod). To couple the threaded rod 216 to threaded rod coupler 214, the lock 270 is initially loosened so that the upper portion of the split nut 232 is not received or engaged by the lock. The threaded rod 216 is inserted into the bushing 64 in the lower portion 260A of the through opening 260 and the end of the threaded rod engages a lower surface of the split nut, as shown in FIGS. 23 and 24. Continued insertion of the threaded rod 216 pushes the nut portions 236, 238 away from one another so that the split nut 232 opens to slidably receive the threaded rod axially therein, as shown in FIGS. 25 and 26. The end of the threaded rod 16 enters the through passage 274 of the lock 270 as the threaded rod is pushed through the threaded rod coupler 214. Once the structural fastener 210 is slid on the threaded rod 216 to the desired longitudinal position, the lock 270 is tightened to inhibit the split nut 232 from opening. The structural fastener 210 threadably engages the threaded rod 216 and can be rotated on the threaded rod to further move the structural fastener to a desired longitudinal position on the threaded rod.

Having described embodiments of the invention in detail, it will be apparent that modifications and variations are possible without departing from the scope of the invention defined in the appended claims.

When introducing elements of the present invention or embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A structural fastener for attaching a threaded rod to a structural component, the structural fastener comprising:
   a structure coupler configured to couple to the structural component; and
   a threaded rod coupler connected to the structure coupler, the threaded rod coupler configured to couple to the threaded rod, wherein the threaded rod coupler includes a split nut configurable between i) an open position to allow the threaded rod to slide axially through the split nut, and ii) a closed position to threadably engage the threaded rod
   wherein the threaded rod coupler further includes a housing connected to the structure coupler, wherein the split nut is received in the housing,
   wherein the split nut includes separate first and second nut portions, each of the first and second nut portions including a nut body that is internally threaded, wherein the nut bodies are selectively movable toward and away from one another to respectively close and open the split nut,
   wherein the threaded rod coupler further includes first and second springs each coupled to and biasing corresponding one of the first and second nut portions toward one another.

2. The structural fastener set forth in claim 1, wherein the spring is received in the housing.

3. The structural fastener set forth in claim 1, wherein the housing defines a through opening generally aligned with the split nut, wherein the through opening is configured to receive the threaded rod therethrough.

4. The structural fastener set forth in claim 3, wherein the threaded rod coupler includes a lock coupled to the housing and configured to selectively inhibit opening of the split nut from the closed position.

5. The structural fastener set forth in claim 4, wherein the lock is threadably coupled to the housing and configured to selectively inhibit movement of the first and second nut portions when the lock is threadably tightened.

6. The structural fastener set forth in claim 5, wherein the lock is configured to selectively allow movement of the first and second nut portions against the bias of the spring when the lock is threadably loosened.

7. The structural fastener set forth in claim 5, wherein the first and second nut portions include a tab extending from the respective nut bodies, wherein when the lock is tightened, the tabs on the split nut enter a through passage of the lock to inhibit the nut bodies from moving away from one another within the housing.

8. The structural fastener set forth in claim 4, wherein each of the first and second springs comprises a pair of compression springs and a connecting arm extending between the pair of compression springs and configured to be received in the slot of the nut arm.

9. The structural fastener set forth in claim 1, wherein the structure coupler comprises a beam clamp configured to couple to a structural beam.

10. The structural fastener set forth in claim 1, wherein the threaded rod coupler further includes a spring biasing the split nut in the closed position.

11. The structural fastener set forth in claim 1, wherein the threaded rod coupler includes a lock coupled to the housing and configured to selectively inhibit opening of the split nut from the closed position.

12. The structural fastener set forth in claim 11, wherein the lock is threadably coupled to the housing and configured to selectively inhibit movement of the first and second nut portions when the lock is threadably tightened.

13. The structural fastener set forth in claim 12, wherein the lock is configured to selectively allow movement of the first and second nut portions when the lock is threadably loosened.

14. The structural fastener set forth in claim 1, wherein the first and second nut portions include a nut arm extending outward from the nut body, wherein the nut arm includes a slot configured to receive the spring.

15. A structural fastener for attaching a threaded rod to a beam, the structural fastener comprising:
- a beam clamp configured to couple to the beam; and
- a threaded rod coupler connected to the beam clamp, the threaded rod coupler configured to couple to the threaded rod, wherein the threaded rod coupler includes a split nut configurable between i) an open position to allow the threaded rod to slide axially through the split, and ii) a closed position to threadably engage the threaded rod,
- wherein the threaded rod coupler further includes a housing connected to the beam clamp, wherein the split nut is received in the housing,
- wherein the split nut includes separate first and second nut portions, each of the first and second nut portions including a nut body that is internally threaded, wherein the nut bodies are selectively movable toward and away from one another to respectively close and open the split nut,
- wherein the threaded rod coupler further includes first and second springs each coupled to and biasing corresponding one of the first and second nut portions toward one another.

16. A method of attaching the threaded rod to the structural component using the structural fastener recited in claim 1, the method comprising:
- coupling the structural fastener to the structural component; and
- sliding the threaded rod through the split nut of the structural component to couple the rod to the structural fastener.

* * * * *